United States Patent
Mayer et al.

(10) Patent No.: US 6,262,171 B1
(45) Date of Patent: *Jul. 17, 2001

(54) EMULSIONS OR ORGANOSILICON COMPOUNDS FOR WATERPROOFING BUILDING MATERIALS

(75) Inventors: Hans Mayer; Ingeborg Koenig-Lumer, both of Burghausen (DE)

(73) Assignee: Wacker-Chemie GmbH, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/527,510

(22) Filed: Mar. 16, 2000

Related U.S. Application Data

(63) Continuation of application No. 08/930,966, filed as application No. PCT/EP96/01993 on May 10, 1996, now abandoned.

(30) Foreign Application Priority Data

Mar. 11, 1995  (DE) ............................................. 195 17 346

(51) Int. Cl.$^7$ .............................. C08L 83/00; C08L 83/06
(52) U.S. Cl. .................... 524/838; 524/837; 106/287.11; 106/287.13; 106/287.16
(58) Field of Search .................................. 524/837, 838; 106/287.11, 287.16, 287.13

(56) References Cited

U.S. PATENT DOCUMENTS

| | | |
|---|---|---|
| 4,247,330 | 1/1981 | Sanders, Jr. . |
| 4,757,106 | 7/1988 | Mayer et al. . |
| 5,039,724 | 8/1991 | Demlehner et al. . |
| 5,091,002 | 2/1992 | Schamberg et al. . |
| 5,281,657 | 1/1994 | Mautner et al. . |
| 5,466,746 | 11/1995 | Geck et al. . |
| 5,712,343 | 1/1998 | Geck et al. . |

FOREIGN PATENT DOCUMENTS

| | | |
|---|---|---|
| 43 06 796 | * 9/1994 | (DE) . |
| 43 28 917 | * 3/1995 | (DE) . |
| 0 340 816 A2 | 11/1989 | (EP) . |

* cited by examiner

Primary Examiner—David W. Wu
Assistant Examiner—Caixia Lu
(74) Attorney, Agent, or Firm—Brooks & Kushman P.C.

(57) ABSTRACT

The invention proposed is an aqueous emulsion comprising the components
(A) organosilicone compositions selected from
(A1) $C_1$–$C_{20}$-alkyl-$C_2$–$C_6$-alkoxysilanes and
(A2) organopolysiloxane containing alkoxy groups,
(B) organopolysiloxane containing, one or more siloxane units having SiC-bonded radicals containing basic nitrogen, with the proviso that the amine number of the organopolysiloxane is at least 0.01, and
(C) an emulsifier.
The said emulsions are used for making porous mineral building materials hydrophobic.

10 Claims, No Drawings

EMULSIONS OR ORGANOSILICON COMPOUNDS FOR WATERPROOFING BUILDING MATERIALS

This is a continuation of copending application(s) Ser. No. 08/930,966 filed on Oct. 2, 1997, now abandoned which is a 371 of PCT/EP96/01993 filed May 10, 1996.

The invention relates to aqueous emulsions of organosilicon compounds for waterproofing porous mineral building materials, and also a process for waterproofing the building materials using the emulsions.

Aqueous emulsions of organosilicon compounds are used for protection of buildings primarily because of their excellent impregnation action against water and dirt, their compatibility with the environment and their physiological acceptability.

U.S. Pat. No. 4,757,106 describes the impregnation of neutral mineral building materials with an aqueous emulsion of polvorganosiloxane containing ammonium groups and polyorganosiloxane containing ethoxy groups.

The waterproofing action is lower on alkaline building materials since the ammonium groups are neutralized and the emulsion breaks. The polyorganosiloxanes can then hardly penetrate into the building material. emulsions which contain resinous, alkoxyl-containing polyorganosiloxanes as active ingredients penetrate well into porous building materials and give these good surf ace hydrophobicity. However, dense building materials are protected only on the surface and for a limited time.

Although emulsions of alkylalkoxysilanes do penetrate well into building materials, they are not storage stable. EP-A-340 816 describes buffered emulsions of alkylalkoxysilanes which are storage stable but, particularly in neutral building materials, precipitate too slowly and therefore give poor waterproofing.

Emulsions which contain resinous, alkoxyl-containing polyorcanosiloxanes and a kylalkoxysilanes as active ingredient are known from U.S. Pat. No. 5,091,002. These emulsions are a compromise between storage stability and waterproofing action on the surface.

The previously known emulsions which contain no polyorganosiloxane containing ammonium groups have poor storage stability in diluted form and display an unsatisfactory early water resistance.

It is an object of the invention to provide storage-stable aqueous emulsions of organosilicon compounds for waterproofing porous mineral building materials and coatings for buildings, and also a process for waterproofing porous mineral building materials and coatings for buildings which is particularly effective for neutral and basic building materials and coatings for buildings.

The invention provides an aqueous emulsion comprising the components
(A) organosilicone compositions
(A1) $C_1$–$C_{20}$-alkyl-$C_2$–$C_6$-alkoxysilanes and
(A2) organopolysiloxane containing alkoxy groups,
(B) organopolysiloxane containing, in addition to other organosiloxane units, siloxane units having SiC-bonded radicals containing basic nitrogen, with the proviso that the amine number of the organopolysiloxane is at least 0.01, and
(C) an emulsifier.

Preferably, the $C_1$–$C_{20}$-alkyl-$C_2$–$C_6$-alkoxysilanes (A1) possess 1 or 2 identical or different, unsubstituted or halogen-substituted, SiC-bonded monovalent $C_1$–$C_{20}$-alkyl radicals and the remaining radicals are identical or different $C_2$–$C_6$-alkoxy radicals. Methoxysilanes hydrolyze too quickly and prevent sufficient storage stability.

Examples of the $C_1$–$C_{20}$-alkyl radicals are the methyl, ethyl, n-propyl, iso-propyl, n-butyl, iso-butyl, tert-butyl, n-pentyl, iso-pentyl, neo-pentyl, tert-pentyl radical; hexyl radicals such as the n-hexyl radical; heptyl radicals such as the n-heptyl radical; octyl radicals such as the n-octyl radical and iso-octyl radicals such as the 2,2,4-trimethylpentyl radical; nonyl radicals such as the n-nonyl radical; decyl radicals such as the n-decyl radical and dodecyl radicals such as the n-dodecyl radical; cycloalkyl radicals such as the cyclopentyl, cyclohexyl, 4-ethylcyclohexyl, cycloheptyl radicals, norbornyl radicals and methylcyclohexyl radicals.

Examples of halogen-substituted $C_1$–$C_{20}$-alkyl radicals are alkyl radicals substituted by fluorine, chlorine, bromine and iodine atoms, for example the 3,3,3-trifluoro-n-propyl radical, the 2,2,2,2',2',2'-hexafluoroisopropyl radical and the heptafluoroiso-propyl radical.

Particular preference is given to the unsubstituted $C_1$–$C_{12}$-alkyl radicals.

Exampies of $C_2$–$C_6$-alkoxy radicals are the ethoxy, n-propoxy, iso-propoxy, n-butoxy, iso-butoxy, sec-butoxy, tert-butoxy radical; pentyloxy radicals such as the n-pentyloxy radical and hexyloxy radicals such as the n-hexyloxy radical. The ethoxy radicals are particularly preferred.

The alkoxy radicals can be substituted by halogen atoms, but this is not preferred.

The emulsion can contain one organopolysiloxane containing alkoxy groups (A2) or a mixture of a plurality of organopolysiloxanes. The organopoly-siloxanes can additionally contain hydroxyl groups which aid binding to the building materials.

The organopolysiloxanes (A2) preferably have a viscosity of at most 2000 mm²/s so as to achieve a particularly good distribution on the pore surfaces in the masonry.

Particular preference is given to the organopolysiloxanes (A2) comprising units of the general formula (I)

$$R_xSi(OR^1)_y(OH)_zO_{\frac{4-x-y-z}{2}} \qquad (I)$$

where
R are identical or different monovalent, unsubstituted or halogen-substituted, SiC-bonded $C_1$–$C_{20}$-hydrocarbon radicals,
$R^1$ are identical or different monovalent, $C_1$–$C_6$-alkyl radicals,
x is 0, 1, 2 or 3, on average from 0.8 to 1.8,
y is 0, 1, 2 or 3, on average from 0.01 to 2.0 and
z is 0, 1, 2 or 3, on average from 0.0 to 0.5, with the proviso that the sum of x, y and z is at most 3.5.

The organopolysiloxane (A2) preferably has a viscosity of from 10 mm²/s to 50,000 mm²/s, in particular from 50 mm²/s to 5000 mm²/s, at 25° C.

Examples of the $C_1$–$C_{20}$-hydrocarbon radicals are the $C_1$–$C_{20}$-alkyl radicals and halogen-substituted $C_1$–$C_{20}$-alkyl radicals listed above for the organalkoxysilanes (A1), alkenyl radicals such as the vinyl, allyl, n-5-hexenyl, 4-vinylcyclohexyl and 3-norbornenyl radical; aryl radicals such as the phenyl, biphenylyl, naphthyl, anthryl and phenanthryl radical; alkaryl radicals such as the o-, m-, p-tolyl radicals, xylyl radicals and ethylphenyl radicals; aralkyl radicals such as the benzyl radical, the alpha- and the β-phenylethyl radical. Particular preference is given to the unsubstituted $C_1$–$C_{12}$-alkyl radicals and the phenyl radical.

Although not indicated in the above formula, part of the radicals R can be replaced by hydrogen atoms directly bonded to silicon atoms. However, this is not preferred.

Examples of the radicals $R^1$ are the methyl, ethyl, n-propyl, iso-propyl, n-butyl, sec-butyl and tert-butyl radical; pentyl radicals such as the n-pentyl radical and hexyl radicals such as the n-hexyl radical, with the ethyl radical being particuarly preferred.

x preferably has an average value of from 0.9 to 1.1. y preferably has an average value of from 0.4 to 1.2. z preferably has an average value of from 0.0 to 0.2.

Examples of organosiloxanes (A2) are those which are obtainable by reaction of methyltrichlorosilane and, if desired, a $C_1$–$C_8$-alkyltrichlorosilane, or phenyltrichlorosilane with ethanol in water, such as the organopolysiloxanes of the empirical formulae $CH_3Si\ (OC_2H_5)_{0.8}O_{1.1}$ or $C_6H_5Si\ (OC_2H_5)0.72O_{1.14}$.

The organopolysiloxanes (B) are preferably ones comprising units of the general formula (II)

$$R_a^2 R_b^3 (OR^4)_c SiO_{\frac{4-a-b-c}{2}}, \quad (II)$$

where $R^2$ are identical or different monovalent, unsubstituted or halogen-substituted, SiC-bonded $C_1$–$C_{20}$-hydrocarbon radicals which are free of basic nitrogen, $R^3$ are identical or different monovalent, unsubstituted or halogen-substituted, SiC-bonded $C_1$–$C_{30}$-hydrocarbon radicals containing basic nitrogen, $R^4$ can be identical or different and can be hydrogen atoms or $C_1$–$C_6$-alkyl radicals, a is 0, 1, 2 or 3, b is 0, 1, 2 or 3, on average at least 0.05, and c is 0, 1, 2 or 3, with the proviso that the sum of a, b and c is less than or equal to 3 and the amine number of the organopolysiloxane (B) is at least 0.01.

The amine number is the number of ml of 1N HCl which are recuired for neutralization of 1 g of organopolysiloxane (B). The amine number of the organopolysiloxane (B) is preferably at least 0.1, in particular at least 0.2, and preferably at most 8, in particular at most 4.

Examples and preferred examples of the radical $R^2$ are given above for the radical R. The methyl and isooctyl radicals are particularly preferred.

Preferably, there is a hydrocarbon radical, in particular a methyl radical, bonded to each silicon atom to which a hydrogen atom is bonded.

The radical $R^3$ is preferably a radical of the general formula (III)

$$R_2^5 NR^6- \quad (III),$$

where $R^5$ can be identical or different and are each hydrogen or a monovalent, unsubstituted or substituted $C_1$–$C_{10}$-hydrocarbon radical or a $C_1$–$C_{10}$-aminohydrocarbon radical and $R^6$ is a divalent $C_1$–$C_{15}$-hydrocarbon radical.

Examples of the radical RS are the examples of hydrocarbon radicals given for the radical R, plus amino-substituted hydrocarbon radicals such as aminoalkyl radicals, with the aminoethyl radical being particularly preferred.

Preferably, at least one hydrogen atom is bonded to each nitrogen atom in the radicals of the general formula (III).

The radical $R^6$ is preferably a divalent hydrocarbon radical having from 1 to 10 carbon atoms, particularly preferably from 1 to 4 carbon atoms, in particular the n-propylene radical.

Examples of the radical $R^6$ are the methylene, ethylene, propylene, butylene, cyclohexylene, octadecylene, phenylene and butenylene radical.

Preferred examples of the radical $R^3$ are $H_2N\ (CH_2)_3-$,
$H_2N\ (CH_2)_2NH\ (CH_2)_2-$,
$H_2N\ (CH_2)_2N\ (CH_2)_3-$,
$H_2N\ (H_2)_2-$,
$H_3CNH(CH_2)_3-$,
$C_2H_5NH(CH_2)_3-$,
$H_3CNH\ (CH_2)_2-$,
$C_2H_5N\ (CH_2)_2-$,
$H_2N\ (CH_2)_4-$,
$H_2N(CH_2)_5-$,
$H(NHCH_2\ CH_2)_3-$,
$C_4H_9N\ (CH_2)_2NH\ (CH_2)_2-$,
cyclo-$C_6H_{11}NH\ (CH_2)_3-$,
cyclo-$C_6H_{11}NH\ (CH_2)_2-$,
$(CH_3)_2N\ (CH_2)_3-$,
$(CH_3)_2N\ (CH_2)_2-$,
$(C_2H_5)_2N\ (CH_2)_3-$ and
$(C_2H_5)_2N\ (CH_2)_2$.

All the examples of alkyl radicals $R^1$ are also applicable to the radical $R^5$.

Examples and preferred examples of the radical $R^4$ are listed above for the radical $R^1$. The methyl and ethyl radicals are particularly preferred.

The preferred average value of a is from 0 to 2, in particular from 0 to 1.8.

The preferred average value of b is from 0.1 to 0.6, in particular from 0.15 to 0.30.

The preferred average value of c is from 0 to 0.8, in particular from 0.01 to 0.6.

The organopolysiloxanes (B) preferably have a viscosity of from 5 to 5000 $mm^2/s$, in particular from 100 to 3000 $mm^2/s$, at 25° C. organopolysiloxanes (B) can be prepared in a known manner, for example by equilibration or condensation of amino-functional silanes with organopolysiloxanes which contain alkoxy groups and/or hydroxyl groups and are free of basic nitrogen.

The aqueous emulsions contain an emulsifier (C) known per se.

Suitable anionic emulsifiers are, in particular:

1. Alkyl sulfates, particularly those having a chain length of from 8 to 18 carbon atoms, alkyl and alkaryl ether sulfates having from 8 to 18 carbon atoms in the hydrophobic radical and from 1 to 40 ethylene oxide (EO) or propylene oxide (PO) units.

2. Sulfonates, particularly alkylsulfonates having from 8 to 18 carbon atoms, alkylarylsulfonates having from 8 to 18 carbon atoms, taurides, esters and monoesters of sulfosuccinic acid with monohydric alcohols or alkyiphenols having from 4 to 15 carbon atoms; if desired, these alcohols or alkylphenols can also be ethoxylated with from 1 to 40 EO units.
3. Alkali metal and ammonium salts of carboxylic acids having from 8 to 20 carbon atoms in the alkyl, aryl, alkaryl or aralkyl radical.
4. Phosphoric acid partial esters and their alkali metal and ammonium salts, particularly alkyl and alkaryl phosphates having from 8 to 20 carbon atoms in the organic radical, alkyl or alkaryl ether phosphates having from 8 to 20 carbon atoms in the alkyl or alkaryl radical and from 1 to 40 EO units.

Suitable nonionic emulsifiers are, in particular:

5. Polyvinyl alcohol still containing from 5 to 50%, preferably from 8 to 20%, of vinyl acetate units and having a degree of polymerization of from 500 to 3000.
6. Alkyl polyglycol ethers, preferably those having from 8 to 40 EO units and alkyl radicals of from 8 to carbon atoms.
7. Alkyl aryl polyglycol ethers, preferably those having from 8 to 40 EO units and from 8 to 20 carbon atoms in the alkyl and aryl radicals.
8. Ethylene oxide/propylene oxide (EO/PO) block copolymers, preferably those having from 8 to 40 EO or PO units.
9. Addition products of alkylamines having alkyl radicals of from 8 to 22 carbon atoms with ethylene oxide or propylene oxide.
10. Fatty acids having from 6 to 24 carbon atoms.
11. Alkyl polyglycosides of the general formula R*—O—$Z_o$, where R* is a linear or branched, saturated or unsaturated alkyl radical having on average 8–24 carbon atoms and $Z_o$ is an oligoglycoside radical having on average o=1–10 hexose or pentose units or mixtures thereof.
12. Natural materials and their derivatives, such as lecithin, lanolin, saponins, celluloses; cellulose alkyl ethers and carboxyalkylcelluloses whose alkyl groups each have up to 4 carbon atoms.
13. Linear organo(poly)siloxanes containing polar groups, in particular those containing alkoxy groups having up to 24 carbon atoms and/or up to 40 EO and/or PO groups.

Suitable cationic emulsifiers are, in particular:

14. Salts of primary, secondary and tertiary fatty amines having from 8 to 24 carbon atoms with acetic acid, sulfuric acid, hydrochloric acid and phosphoric acids.
15. Quaternary alkylammonium and alkylbenzeneammonium salts, in particular those whose alkyl group has from 6 to 24 carbon atoms, in particular the halides, sulfates, phosphates and acetates.
16. Alkylpyridinium, alkylimidazolinium and alkyloxazolinium salts, in particular those whose alkyl chain has up to 18 carbon atoms, especially the halides, sulfates, phosphates and acetates.

Suitable ampholytic emulsifiers are, in particular:

17. Long-chain-substituted amino acids, such as N-alkyl-di(aminoethyl)glycine or N-alkyl-2-aminopropionic acid salts.
18. Betaines, such as N-(3-acylamidopropyl)-N,N-dimethylammonium salts having a $C_8$–$C_{18}$-acyl radical and alkylimidazolium becaines.

Preferred emulsifiers are nonionic emulsifiers, in particular the addition products of alkylamines with ethylene oxide or propylene oxide indicated above under 9., the alkylpolyglycosides indicated above under 11. and the polyvinyl alcohol indicated above under 5. Particularly preferred polyvinyl alcohols still contain from 5 to 20%, in particular from 10 to 15%, of vinyl acetate units and preferably have a degree of polymerization of from 500 to 3000, in particular from 1200 to 2000.

The total amount of the components (A) and (B) in the aqueous emulsions is preferably from 1 to 80% by weight, in particular from 10 to 75% by weight, especially from 30 to 70% by weight.

The proportion of the emulsifier (C) is preferably from 0.1 to 30% by weight, in particular from 2 to 10% by weight, of the total amount of the components (A) and (B).

The emulsions can additionally contain customary fillers and thickeners, in particular reinforcing fillers, i.e. fillers having a BET surface area of more than 50 $m^2/g$, for example pyrogenic silica, precipitated silica and silicon-aluminum mixed oxides of high BET surface area. Finely divided silica is particularly suitable. It is possible to use one type of filler or a mixture of at least two fillers. The proportion of fillers is preferably at most 5, in particular 2, % by weight of the total amount of the components (A) and (B).

The emulsions can also contain buffer substances which stabilize the pH in the range from 5 to 8 in which the alkyltrialkoxysilanes are very resistant to hydrcaysis. Suitable buffer substances are all organic and inorganic acids and bases which are chemically inert toward the other constituents of the emulsions, in particular the alkali metal, alkaline earth metal and ammonium salts of carboxylic acids, phosphoric, carbonic and sulfuric acid. Particularly preferred are sodium carbonate, sodium hydrogen carbonate, sodium hydrogen phosphate and a mixture of acetic acid and aqueous ammonia solution. The preferred amount of buffer substances is preferably at most 3, in particular 1, % by weight of the total amount of the components (A) and (B).

In addition to the above-described constituents, the emulsions can additionally contain fungicides, bactericides, algicides, microbicides, scents, corrosion Inhibitors and antifoaming agents as additives. The preferred amount of additives is at most 2, in particular 0.5, % by weight of the total amount of the components %A) and (B).

The aqueous emulsions of he present invention are prepared by customary processes for preparing aqueous emulsions. Preferably, only part of the water is initially mixed with the emulsifier (C), then the component (B) and finally the component (A) are emulsified until a viscous oil phase is formed and the remaining water is subsequently emulsified in to form a less viscous emulsion. It is also possible to mix the components (A) and (B) and add them to an emulsion of emulsifier and water. Mixing is preferably carried out in pressure-emulsification machines, colloid mills or, in particular, in a fast-running stator-rotor stirring device as described by Prof. P. Willems.

The invention likewise provides a process for waterproofing porous mineral building materials and coatings for buildings, which comprises treating the building materials and coatings for buildings with the above aqueous emulsion.

The invention likewise provides a process for waterproofing coating compositions forming porous mineral coatings for buildings, which comprises admixing the coating compositions with the above aqueous emulsion.

The emulsions are suitable for waterproofing mineral building materials such as natural or synthetic stone, concrete, cement, lime-sand brick and porous concrete, building materials of clay minerals, such as bricks, as additive having a waterproofing and, if desired, binding action to gypsum plaster, rendering and in coatings for buildings such as mineral paints, silicone resin emulsion paints and renders, silicate dispersion paints, emulsion paints, filling coatings, reinforcing compositions and primers. In particular, the early rain resistance is improved in the case of coating compositions for buildings.

The emulsions are also suitable for waterproofing finely divided inorganic materials such as perlite, vermiculite and thermal insulation materials.

The emulsions are particularly suitable for waterproofing mineral-bound, preferably cement-bound fibrous building materials whose fibers consist of natural fibers or synthetic fibers. Suitable natural fibers are mineral fibers such as rockwool, quartz or ceramic fibers or plant fibers such as cellulose.

Suitable synthetic fibers are, for example, glass fibers, polymer fibers and carbon fibers. Particular preference is given to use of the emulsion for waterproofing cement-bound cellulose fiber components. The cellulose fibers can, for example, be jute, coconut or hemp fibers or originate from paper, cardboard or wastepaper.

The emulsions are suitable for use in bulk, i.e. the emulsion is added to a hydraulic mixture for producing components prior to setting, or for waterproofing components after setting.

The emulsions of the present invention can be diluted with water prior to their use as waterproofing agents and, if desired, binders. A dilution of up to a total content of the components (A) and (B) of 1% by weight is favorable for the surface impregnation of building materials after setting.

In the following examples, all parts and percentages are, unless otherwise indicated, by weight. Unless otherwise indicated the following examples are carried out at the pressure of the surrounding atmosphere, i.e. at about 0.10 MPa, and at room temperature, i.e. at about 20° C., or at the temperature which becomes established on combining the reactants at room temperature without additional heating or cooling. All viscosities given in the examples are at a temperature of 25° C. The solids content of the emulsions is the sum of all components with the exception of water.

EXAMPLES

Components (A) used are:

H1: iso-octyltriethoxysilane
H2: Organopolysiloxane of the empirical formula $CH_3Si(OC_2H_5)_{0.8}O1.1$ having an average molecular weight of about 650 g/mol and a viscosity of about 20 mm$^2$/s.
H3: High-viscosity liquid methylsilicone resin comprising $CH_3SiO_{3/2}$ units with about 20 mol % of $(CH_3)_2SiO_{2/2}$ units and about 10 mol % of $C_2H_5OSiO_{3/2}$ units and having a molecular weight of about 5000 g/mol.
H4: Pulverulent methylsilicone resin comprising $CH_3SiO_{3/2}$ units with about 3 mol % of $(CH_3)_2SiO_{2/2}$ units and about 4 mol % of $C_2H_5OSiO_{3/2}$ units, having a molecular weight of about 5000 g/mol and a softening point of about 50° C.

Components (B) used are:
N1: Condensation product of a α,ω-dihydroxymethylpolysiloxane having an Si-bonded hydroxyl group in each of the terminal units and N(-2-aminoethyl)-3-aminopropyltrimethoxysilane in the presence of KOH having an amine number of about 0.3, a viscosity of about 1500 mm$^2$/s at 25° C. and a residual methoxy content of less than 5 mol %, based on the methoxy groups initially present in the N(-2-aminoethyl)-3-aminopropyltrimethoxysilane.
N2: Condensation product analogous to N1, but having an amine number of about 0.6 and a viscosity of about 2000 mm$^2$/s at 25° C.
N3: Condensation product of H2 and N(-2-aminoethyl)-3-aminopropyltrimethoxysilane in the presence of KOH having an amine number of about 3.0, a viscosity of about 500 mm$^2$/s at 25° C. and a residual methoxy content of less than 5 mol %, based on the methoxy groups initially present in the N(-2-aminoethyl)-3-aminopropyltrimethoxysilane.

Components (C) used are:
E1: Genamin® 200 from Hoechst AG, Frankfurt, a reaction product of stearylamine and ethylene oxide
E2: Glukopong 225 from Henkel KGBA, Dusseldorf, a fatty alcohol C8–C10 glycoside in aqueous solution
E3: Polyviol® W 25/140 from Wacker-Chemie GmbH, Munich, a polyvinyl alcohol having a degree of polymerization of about 1600 and still containing 11–14% of acetoxyethylene units.

Preparation of the Emulsions of the Present Invention

The aqueous emulsions of the present invention are prepared by first mixing a part of the water with emulsifier and emulsifying amino-functional polysiloxane followed by silane and/or silicone resin. Both the mixing mentioned first and the emulsification is carried out in a fast-running stator-rotor stirring apparatus as described by Prof. P. Willems. The compositions are shown below in Table I.

TABLE I

| Emulsion | Silane or silicone resin [% by weight) | Aminopolysiloxane [% by weight] | Emulsifier [% by weight] | Water [% by weight] | Solids content [% by weight] |
| --- | --- | --- | --- | --- | --- |
| EM 1 | H 1/66.5 | N 1/3.5 | E 1/0.7 | 29.3 | 70.7 |
| EM 2 | H 1/34 | N 2/34 | E 1/2 | 30 | 70 |
| EM 3 | H 1/3.5 | N 1/66.5 | E 1/4 | 26 | 74 |
| EM 4 | H 2/43 | N 1/28 | E 1/2.9 | 26.1 | 73.9 |
| EM 5 | H 2/61.2 | N 1/6.8 | E 1/2 | 30 | 70 |
| EM 6 | H 3/23 | N 3/23 | E 2/2 + E 3/2 | 50 | 50 |
| EM 7 | H 1/32.4+ H 4/8.1 | N 2/4.5 | E 1/1.3 + E 2/3.7 | 50 | 50 |
| EM 8 | H 1/54 | N 1/6 | E 1/0.5 + E 2/2.7 | 36.8 | 63.2 |
| EM 9 | H 1/6 | N 1/54 | E 1/1 + E 2/3 | 36 | 64 |
| EM 10 | H 2/6.8 | N 1/61.2 | E 2/2 + E 3/1 | 29 | 71 |

The emulsions EM 1 to EM 10 show no phase separation at all after storage for 14 days at 50° C., likewise after storage for 6 months at room temperature. They are thus storage stable.

A notable point is the very good beading effect of water when dilutions of the emulsions EM 1 to EM 10 having an active content of from about 1 to 10% are applied to mineral surfaces. Contact angles of >90° are measured for the treated surfaces.

Preparation of the Emulsions not According to the Present Invention

The emulsions not according to the present invention are prepared by a method similar to that for the emulsions of the present invention. The compositions are shown below in Table II.

TABLE II

| Emulsion | Silane or silicone resin [% by weight) | Aminopoly-siloxane [% by weight] | Emulsifier [% by weight] | Water [% by weight] | Solids content [% by weight] |
|---|---|---|---|---|---|
| CE 1 | H 1/60 | — | E 1/0.5+ E 2/2.7 | 36.8 | 63.2 |
| CE 2 | i-octyl-trimethoxy silane/60 | — | E 1/0.5 + E 2/2.7 | 36.8 | 63.2 |
| CE 3 | i-octyl-trimethoxy silane/54 | A 1/6 | E 1/0.5 + E 2/2.7 | 36.6 | 63.2 | and waterproofed lime-sand brick was assessed, as was the beading effect of dripped-on water by measurement of the contact angle. Contact angles of >90° indicated good beading effects and contact angles of <90° indicated poor beading effects. The results are shown in Table III below.

Cured concrete test specimens are dipped for one minute into the emulsions. After storage for 14 days at room temperature, the test specimens are broken. The thickness of the hydrophobic zone at the surface indicates the penetration depth. The water absorption of the concrete falls with the penetration depth and at the same time the hydrophobicity of the concrete increases. The results are shown in Table III below.

The emulsions are applied to lime-sand brick by means of a brush. After storage for 14 days at room temperature, the water absorption is assessed by measurement of the water absorption coefficient w in accordance with DIN 52617. Values of $w<0.1$ $kg/m^2 \times s^{1/2}$ indicate an extremely low water absorption.

TABLE III

| Emulsion/ solids content | Storage stability | Discoloration | Beading effect/ contact angle | Penetration depth | w value |
|---|---|---|---|---|---|
| EM 1, 70.7 | + + + | none | very good/120° | 7 mm | — |
| EM 1, 20 | + + + | none | very good/140° | 4 mm | 0.053 $kg/m^2 \times s^{1/2}$ |
| EM 8, 63.2 | + + + | none | very good/110° | 6 mm | — |
| EM 8, 50 | + + + | none | very good/110° | 6 mm | — |
| EM 8, 20 | + + + | none | very good/115° | 4 mm | 0.060 $kg/m^2 \times s^{1/2}$ |
| EM 8, 10 | + + + | none | very good/128° | 2 mm | — |
| EM 8, 5 | + + + | none | very good/140° | 1 mm | — |
| CE 1, 63.2 | + + | none | none/0° | 6 mm | — |
| CE 1, 20 | − | none | none/0° | 4 mm | 0.23 $kg/m^2 \times s^{1/2}$ |
| CE 2, 63.2 | + | strong | poor/50° | <1 mm | — |
| CE 2, 20 | − | slight | poor/60° | <1 mm | 0.38 $kg/m^2 \times s^{1/2}$ |
| CE 3, 63.2 | + | strong | very good/110° | <1 mm | — |
| CE 3, 20 | + | slight | very good/120° | <1 mm | 0.35 $kg/m^2 \times s^{1/2}$ |

Example 1

Waterproofing Composition for Porous Mineral Building Materials

Emulsions according to the present invention and not according to the present invention are diluted with water to the solids content in Table III below.

Before use on porous mineral building materials, the emulsions according to the present invention and not according to the present invention are stored for 14 days at 50° C. and assessed visually. The symbols shown On Table III below have the following meanings:

+++: no visible change
++: slight agglomeration (creaming), reversible by shaking
+: strong agglomeration (creaming), reversible by shaking
−: irreversible phase separation resulting from coalescence.

Storage of the emulsions for 6 months at room temperature causes the same changes.

The emulsions are applied to lime-sand brick coated with mineral paint (silicate paint Purkristallat® from Keimfarben GmbH, Diedorf) by means of a brush. After storage for 14 days at room temperature, the discoloration of the coated Example 2

Waterproofing Primer for Mineral Coatings on Mineral Building Materials

Emulsion EM 2 diluted to a solids content of 10% by weight is applied to lime-sand brick in an amount of 400 $g/m^2$. After storage for 14 days at room temperature, the following properties of the waterproofed lime-sand brick are measured in a similar way to Example 1:
Beading effect: very good
Contact angle: 130°
Penetration depth: 3 mm
w value: 0.073 $kg/m^2 \times s^{1/2}$
sd value: 0.02 m The sd value was measured in accordance with DIN 52615; sd values <0.1 m indicate high water vapor permeability, sd values >0.1 m indicate reduced water vapor permeabilities.

The lime-sand brick stored for 14 days is painted with silicone resin emulsion paint in accordance with DIN 18363 (the content of organic resins does not exceed the content of organopolysiloxanes). The adhesive pull strength of the coating is then determined in accordance with ISO 4624 as 2.8 $N/mm^2$. Without the waterproofing priming with emulsion EM 2, 10% strength, the adhesion of this silicone resin paint on lime-sand brick is determined as only 1.5 $N/mm^2$.

Emulsion EM 7 diluted to a solids content of 10% by weight is stored for 14 days at 50° C. and shows no visible change after this. Subsequently, this diluted emulsion is applied by brush to a fibrocement coated to a thickness of 2 mm with friable lime-cement render and then stored for 14 days at room temperature.

For the untreated lime-cement render, a w value of 1.3 $kg/m^2 \times s^{1/2}$ is found.

The following properties of the lime-cement render thus waterproofed are found:
Beading effect: very good
Contact angle: 125°
Penetration depth: 2 mm
w value: 0.068 $kg/m^2 \times s^{1/2}$ The improved surface strength of the lime-cement render after the application of 10% strength EM 7 is notable.

The substrate thus treated can be coated with silicone resin emulsion paints as per Example 3. All preparations thus coated show no flaking or color changes of any sort after Q-UV rapid weathering for 1000 hours while maintaining the very good beading effect.

Example 3

Waterproofing Binders for Aqueous House Paints and Renders

Silicone resin emulsion paints in accordance with DIN 18363 and silicone resin renders are examined here. These coating compositions belong to the class in which the content of organic resins does not exceed the content of organopolysiloxanes.

After application, conventional silicone resin paints and renders initially still have a relatively high water absorption capacity over a certain time ("washing-out period") and this limits the initial resistance to weathering influences such as rain.

It is demonstrated below how the emulsions of the present invention give emulsion paints for house exteriors early rain resistance.

The preparation of emulsion paints is carried out using a high-speed mixer. The amount of water provided for in the formulation is here initially charged in the mixing container. The pigment wetting aids are added. Then the fillers and pigments are added and predispersed for about 5 minutes. After the pigment and filler agglomerates have been broken up, the waterproofing emulsion is stirred in and dispersed for a further 5 minutes with the total mixture. As a last step, a polymer emulsion is added and stirred in for 1 minute until homogeneously dispersed. The emulsion paint made in this way is subsequently adjusted to the processing consistency using a thickener.

| Formulation | |
|---|---|
| 210.7 | parts by weight of water |
| 8.4 | parts by weight of sodium polyphosphate solution (10% strength in $H_2O$) |
| 1.4 | parts by weight of pigment wetting aids (based on polyacrylic acid) |
| 70.2 | parts by weight of talc (particle size 20 µm) |

| -continued | |
|---|---|
| Formulation | |
| 70.2 | parts by weight of precipitated calcium carbonate (mean particle size 0.3 µm) |
| 140.4 | parts by weight of calcium carbonate (calcite-type filler, mean particle size 5 µm) |
| 140.4 | parts by weight of calcium carbonate (calcite-type filler, mean particle size 15 µm) |
| 140.4 | parts by weight of titanium dioxide, rutile type |
| 140.4 | parts by weight of waterproofing emulsion |
| 56.2 | parts by weight of styrene/acrylic ester dispersion, 50% strength in $H_2O$ (polymer dispersion) |
| 21.3 | parts by weight of thickener (hydroxyethylcellulose, 2.5% strength solution in $H_2O$) |
| 1000.0 | parts by weight |

Testing

House paints prepared according to the above process and above formulation are examined for their water absorption. In this test, the absorbent action of a building material or that of the composite system building material/coating is measured. The measurement of the capillary water absorption is described in DIN 52617. The method used here is carried out as a short test in accordance with the above procedure. The paint substrates used are lime-sand brick disks (115×70×20 mm having a surface area of 0.008 $m^2$). For the coating of the paint substrates, 6.5 g are poured onto the surface as first coat and uniformly distributed using a flat brush, with the side faces likewise being coated. The second coat is applied after an interval of 24 hours. The amount of paint applied is 4.5 g. The coated test specimens are stored for 24 hours at room temperature and subsequently for 24 hours at 50° C. For further conditioning, this is followed by additional storage for 24 hours at room temperature.

The test specimens thus prepared are introduced into dishes lined with foam and filled with water in such a way that the painted surface always remains in contact with the foam surface saturated with water. The weight gain is measured as a function of time (after 2, 6 and 24 hours) and compared with that of the untreated test specimen.

Reference

An untreated test specimen is subjected to water storage in accordance with the test method described

| Storage time [hours] | Water absorption [$kg/m^2$] |
|---|---|
| 2 | 2.98 |
| 6 | 3.01 |
| 24 | 3.1 |

House Paint According to the Present Invention

In the above formulation, the emulsions of the present invention EM 4, EM 5 or EM 6 are used undiluted as waterproofing emulsion in the amount given in the formulation. In the testing for water absorption, the values shown in Table IV are found:

TABLE IV

| Storage time | Water absorption [kg/m²] | | |
|---|---|---|---|
| (hours) | EM 4 | EM 5 | EM 6 |
| 2 | 0.15 | 0.10 | 0.20 |
| 6 | 0.25 | 0.20 | 0.35 |
| 24 | 0.33 | 0.33 | 0.45 |

House Paint not According to the Present Invention

A paint according to the formulation is prepared by leaving out the waterproofing emulsion and by first dispersing in the water a silicone resin having the average composition $(CH_3)_{1.2}Si(O)_{1.38}(OH)_{0.04}$ whose viscosity was adjusted to 2050 mPa·s (23° C.) by addition of 45 parts by weight of solvent naphtha, using 8.4 parts by weight of a polyethylene oxide-alkylamine as emulsifier. The inorganic constituents, etc, are subsequently dispersed.

| Storage time [hours] | Water absorption [kg/m²] |
|---|---|
| 2 | 0.40 |
| 6 | 2.90 |
| 24 | 3.10 |

This specimen is subsequently stored in water again. This second storage then gives the following values:

| Storage time [hours] | Water absorption [kg/m²] |
|---|---|
| 2 | 0.10 |
| 8 | 0.25 |
| 24 | 0.50 |

Example 4

Waterproofing Additive for Aqueous Highly Filled House Paints and Renders

The materials looked at here are highly filled, low-binder house paints having a high capillary water absorption, such as silicate dispersion paints and renders, highly filled coatings based on dispersions, lime emulsion paints, filler paints and reinforcing compositions, mineral paints, mineral renders, lime paints and the like. The pigment volume concentration of the coating is typically above 50%. The water absorption of the abovementioned coating compositions is usually at least 3 kg/r² after 24 hours, determined by the short test described in Example 3.

Addition of only 1% of the undiluted emulsions of the present invention as waterproofing additive to the coating compositions shown below in Table V drastically reduces the capillary water absorption. The water absorption was determined by the short test in accordance with DIN 52617 on lime-sand brick.

TABLE V

| Coating composition | Water absorption [kg/m²] | Addition of 1% by weight of |
|---|---|---|
| Silicate dispersion paint | 6.4 | — |
|  | 0.28 | EM 3 |
| Slaked lime render | 7.4 | — |
|  | 0.35 | EM 9 |
| Filling dispersion paint | 3.4 | — |
| (Pigment volume concentration = 70) | 0.62 | EM 10 |

What is claimed is:

1. A process for rendering porous, mineral-based building materials water-repellant, said process comprising:
   applying to the surface of said porous, mineral-based building materials, a coating composition containing an aqueous emulsion comprising:
   (A) organosilicone compositions
   (A1) $C_1$–$C_{20}$-alkyl-$C_2$–$C_6$-alkoxysilanes or
   (A2) organopolysiloxane containing alkoxy groups free of Si—C bonded basic nitrogen,
   (B) organopolysiloxane containing siloxane units having SiC-bonded radicals containing basic nitrogen, where the amine number of the organopolysiloxane is at least 0.01, and
   (C) an emulsifier.

2. The process of claim 1, wherein the $C_1$–$C_{20}$-alkyl-$C_2$–$C_6$-alkoxysilanes (A1) have one or two identical or different, unsubstituted or halogen-substituted, SiC-bonded monovalent $C_1$–$C_6$-alkyl radicals and any remaining radicals are identical or different $C_2$–$C_6$-alkoxy radicals.

3. The process of claim 1, wherein the organopolysiloxanes (A2) are built up of units of the formula

$$R_x Si(OR^1)_y (OH)_z O_{\frac{4-x-y-z}{2}}, \quad (I)$$

where
R an identical or different monovalent, unsubstituted or halogen-substituted, SiC-bonded $C_1$–$C_{20}$-hydrocarbon radical,
$R^1$ is an identical or different monovalent, $C_1$–$C_6$-alkyl radical,
x is 0, 1, 2 or 3,
y is 0, 1, 2 or 3,
z is 0, 1, 2 or 3,
with the proviso that the sum of x, y and z is at most 3.5.

4. The process of claim 1, wherein the organopolysiloxanes (B) are built up of units of the formula

$$R_a^2 R_b^3 (OR^4)_c SiO_{\frac{4-a-b-c}{2}}, \quad (II)$$

where
$R^2$ are identical or different monovalent, unsubstituted or halogen-substimted, SiC-bonded $C_1$–$C_{20}$-hydrocarbon radicals free of basic nitrogen,
$R^3$ are an identical or different monovalent, unsubstituted or halogen-substituted, SiC-bonded $C_1$–$C_{30}$-hydrocarbon radicals containing basic nitrogen,
$R^4$ are identical or different, and are hydrogen or a $C_1$–$C_6$-alkyl radical, a is 0, 1, 2 or 3, b is 0, 1, 2or 3, c is 0, 1, 2 or 3, with the proviso that the sum of a, b and c is less than or equal to 3 and the amine number of the organopolysiloxane (1) is at least 0.01.

5. The process of claim 4, wherein the radical $R^3$ is a radical of the formula $$R^5{}_2NR^6— \quad (III),$$

where $R^5$ are identical or different and are hydrogen or a monovalent, unsubstituted or substituted $C_1$–$C_{10}$-hydrocarbon radical or a $C_1$–$C_{15}$ hydrocarbon radical.

6. The process of claim 1, wherein the organopolysiloxanes (B) have a viscosity of from 5 to 5000 mm$^2$/s at 25° C.

7. The process of claim 1, wherein the emulsifier (C) is selected from the group consisting of polyvinyl alcohols having from 5% to 50% vinyl acetate units and a degree of polymerization of from 500 to 3,000; addition products of alkyl-amines having alkyl radicals from 8 to 22 carbon atoms with ethylene oxide or propylene oxide; alkyl polyglycosides of the formula $$R^*—O—Z_o,$$

where $R^*$ is a linear or branched, saturated or unsaturated alkyl radical having on average of 8–24 carbon atoms, and $Z_o$ is an oligoglycoside radical where o has an average value of 1 to 10; and mixtures thereof.

8. The process of claim 1, wherein the proportion of the emulsifier (C) is from 0.1% to 30% by weight of the total amount of the components (A) and (B).

9. The process of claim 7 where the oligoglycoside is a hexose unit, pentose unit or mixture thereof.

10. A process for preparing a water-repellant coating composition for porous, mineral-based building materials, comprising admixing a coating composition comprising at least one pigment and a binder with an aqueous emulsion comprising;

(A) organosilicone compositions (A1) C1–$C_{20}$-alkyl-$C_2$–$C_6$-alkoxysilanes or (A2) organopolysiloxane containing alkoxy groups free of Si—C bonded basic nitrogen, (B) organopolysiloxane containing siloxane units having SiC-bonded radicals containing basic nitroen, where the amine number of the organopolysiloxane is at least 0.01, and (C) an emulsifier.

* * * * *

UNITED STATES PATENT AND TRADEMARK OFFICE
CERTIFICATE OF CORRECTION

PATENT NO. : 6,262,171 B1  
DATED : July 17, 2001  
INVENTOR(S) : Hans Mayer et al.

Page 1 of 1

It is certified that error appears in the above-identified patent and that said Letters Patent is hereby corrected as shown below:

<u>Column 14, claim 4,</u>  
Line 61, delete "substimed" and insert -- substituted --.

<u>Column 15, claim 4,</u>  
Line 6, delete "(1)" and insert -- (B) --.

Signed and Sealed this

Sixteenth Day of April, 2002

Attest:

Attesting Officer

JAMES E. ROGAN  
Director of the United States Patent and Trademark Office

UNITED STATES PATENT AND TRADEMARK OFFICE
CERTIFICATE OF CORRECTION

PATENT NO. : 6,262,171 B1
DATED : July 17, 2001
INVENTOR(S) : Hans Mayer and Ingeborg Koenig-Lumer It is certified that error appears in the above-identified patent and that said Letters Patent is hereby corrected as shown below:

<u>Title page,</u>
Item [30], Foreign Application Priority Data:

"Mar. 11, 1995 (DE) ……. 195 17 346" should read
-- May 11, 1995  (DE) ……. 195 17 356 --.

Signed and Sealed this

Twelfth Day of November, 2002

*Attest:*

*Attesting Officer*

JAMES E. ROGAN
*Director of the United States Patent and Trademark Office*